D. C. YOUNG.
EDUCATIONAL DEVICE FOR THE ILLUSTRATION OF LONGITUDE AND TIME.
No. 10,683. Reissued Feb. 2, 1886.
Fig. I.
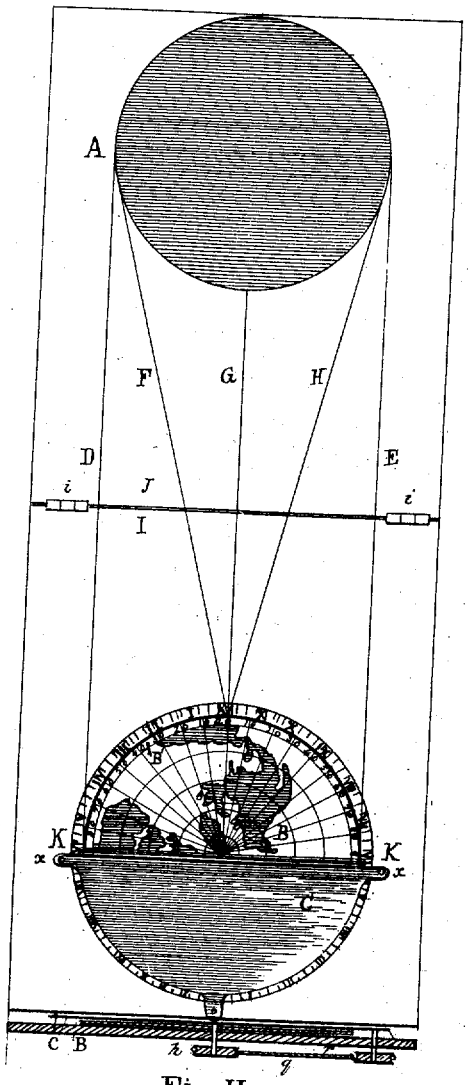
Fig. II.
Witnesses.
G. A. Taubenschmidt.
F. P. Metzger
Inventor.
Daniel C. Young
by F. W. Ritter Jr
atty.

UNITED STATES PATENT OFFICE.

DANIEL C. YOUNG, OF HANOVER, KANSAS.

EDUCATIONAL DEVICE FOR THE ILLUSTRATION OF LONGITUDE AND TIME.

SPECIFICATION forming part of Reissued Letters Patent No. 10,683, dated February 2, 1886.

Original No. 328,629, dated October 20, 1885. Application for reissue filed January 6, 1886. Serial No. 187,825.

*To all whom it may concern:*

Be it known that I, DANIEL C. YOUNG, a citizen of the United States, residing at Hanover, in the county of Washington, State of Kansas, have invented certain new and useful Improvements in Educational Devices; and I hereby declare the following to be a full, clear, and exact description of the same, reference being had to the accompanying drawings, forming a part of the same, in which—

Figure I is a plan view of the instrument. Fig. II is a section on the line *x x*, Fig. I.

Like letters refer to like parts wherever they occur.

This invention relates to an astronomical instrument by means of which instruction may be imparted to students in explaining the longitude and also the exact time in the day or night of any particular place or places on the earth's surface, all of which will be hereinafter more particularly described, and the novelty therein pointed out in the claims.

I will now proceed to describe my invention more specifically, so that others skilled in the art to which it appertains may apply the same.

A is a representation of the disk of the sun. B represents the earth. C is the shaded or night part of the earth. The line D represents the first rays of the sun at sunrise. E represents the last rays of the sun at sundown. The lines F, G, and H, drawn from the opposite sides and center of the sun, converging to any point on the earth's surface, represent the meridian of that point. The line drawn from the north to the south pole through said point is the meridian or line of longitude of that place.

To construct an instrument according to my invention and to make it portable, I have two plain boards, I and J, which are hinged together at *i i*, and which can be folded one over the other to protect the apparatus. On one of these boards, J, I represent the disk of the sun, A, and color it red. On the other board, I, a double circle, K, is made and divided into twenty-four equal parts, and each half is numbered like a clock, from I to XII, making the two XII numbers on the central line, G, extended—that is, the line drawn from the center of the sun, A, to the center of the earth B. B is a disk, of either card-board or of metal, painted, on which is represented the earth from the equator to the north pole, or the northern hemisphere. If desired, a similar representation can be made of the countries in the southern hemisphere on the opposite side of the disk, and the disk B can be made reversible. This disk B is fastened to the center of the circle K by a pivot, so that it can be revolved. Over one-half of the disk B a metallic plate is secured, on which may be painted a representation of darkness or night, being that portion of the earth away from the sun. On the outer circles of the northern hemisphere the degrees of longitude are properly numbered (on the outer circles at the equator B′) to correspond with the maps in general use, taking any principal meridian as zero.

The operation of this instrument is as follows, viz: To ascertain the difference in time between any two or more places, bring either place to the XII-mark at *a*. Then from the other places trace along the meridian-line to the equator, and corresponding with said line will be found the hour and minute.

The drawings represent the meridian of Washington city at XII. All the places east of Washington have the time after twelve o'clock, and those west are before twelve. Those places beyond the diameter are either after sunset or before sunrise.

If desired, the disk representing the earth may be revolved by means of a pulley, *p*, on the axle of the rotable disk, and a cord, *q*, and crank *r*, as shown in Fig. 2.

Having thus described the nature and operation of my invention, what I claim, and desire to secure by Letters Patent, is—

1. An instrument for the illustration of the longitude of places on the earth's surface, and the comparative time-tables for all parts thereof, consisting of a rotatable disk representing a hemisphere, either northern or southern, having around it the representation in numerals of the hours and minutes of the day, and a diagram of the sun with the lines of sunrise, meridian, and sunset rays delineated thereon, substantially as and for the purpose described.

2. An instrument for the illustration of longitude and comparative time of places on the earth's surface, consisting of a reversible rotatable disk having the opposite hemispheres delineated on opposite sides and having an hour-dial and a diagram of the sun, said devices relatively arranged and coacting substantially as and for the purposes specified.

3. An educational device composed of folding leaves, one leaf provided with a diagram to represent the sun and the other with a rotatable disk to represent the earth, substantially as and for the purposes specified.

In testimony whereof I affix my signature, in presence of two witnesses, this 25th day of December, 1885.

D. C. YOUNG.

Witnesses:
JOHN BUENTING,
LUEFFO D. BUENTING.